United States Patent
Mormino, Jr.

(10) Patent No.: US 7,723,650 B2
(45) Date of Patent: May 25, 2010

(54) CONTACTOR ASSEMBLY FOR WIRE FEEDER

(75) Inventor: Nicholas G. Mormino, Jr., Mayfield Heights, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 1120 days.

(21) Appl. No.: 11/321,790

(22) Filed: Dec. 29, 2005

(65) Prior Publication Data

US 2007/0151965 A1 Jul. 5, 2007

(51) Int. Cl.
*H05B 1/02* (2006.01)
(52) U.S. Cl. .................. 219/497; 219/213; 219/505
(58) Field of Classification Search ............ 219/121.45, 219/121.52, 137.2, 137.61, 137 R
See application file for complete search history.

(56) References Cited

U.S. PATENT DOCUMENTS

| | | | |
|---|---|---|---|
| 2,808,499 A | | 10/1957 | Anderson |
| 3,571,770 A | * | 3/1971 | Dew .......................... 335/256 |
| 3,813,625 A | | 5/1974 | Kinsella |
| 3,992,687 A | * | 11/1976 | Schantz et al. .............. 335/247 |
| 4,491,720 A | * | 1/1985 | Worsely ..................... 219/136 |
| 4,508,954 A | | 4/1985 | Kroll |
| 4,665,300 A | | 5/1987 | Bellefleur |
| 4,706,037 A | | 11/1987 | Prouty et al. |
| 5,410,126 A | | 4/1995 | Miller et al. |
| 5,836,539 A | | 11/1998 | Grimm et al. |
| 6,213,375 B1 | | 4/2001 | Rybicki |
| 6,225,596 B1 | | 5/2001 | Chandler et al. |
| 6,705,563 B2 | | 3/2004 | Luo et al. |

OTHER PUBLICATIONS

Chinese Notice of the First Office Action dated Aug. 22, 2008.
CN 200610172808.3 Office Action dated Apr. 10, 2009.

* cited by examiner

*Primary Examiner*—Mark H Paschall
(74) *Attorney, Agent, or Firm*—Hahn, Loeser & Parks, LLP (57) ABSTRACT

A portable wire feeder for providing welding wire and welding current to a welding operation includes an input electrically connected to a power source. An output is selectively electrically connected to the input to receive welding current delivered to the input from the power source and to provide the welding current and welding wire to the welding operation through a guide hose. A contactor includes a first electrical terminal, a second electrical terminal and a conductive bridge member for selectively electrically connecting the input to the output. The first electrical terminal is electrically connected to the input. The second electrical terminal is electrically connected to the output. The conductive bridge member is movable between the first position in which the bridge member electrically connects the first electrical terminal to the second electrical terminal and a second position wherein the bridge member is separated from at least one of the first and second electrical terminals to electrically isolate the terminals from one another. At least one of the first electrical terminals, the second electrical terminal and the bridge member is independently removable from the contactor for servicing or replacement. A motorized wire feeding system includes a motor and a feed roll driven by the motor to direct the welding wire from a wire supply to the output for provision of the welding wire to the welding operation through the guide hose.

25 Claims, 6 Drawing Sheets

CONTACTOR ASSEMBLY FOR WIRE FEEDER

BACKGROUND

1. Field of the Invention

Exemplary embodiments disclosed herein generally relate to electric arc engine welders, including those employing a welding gun for use in a welding operation and a wire feeder for supplying a consumable welding wire electrode to the welding gun. More particularly, exemplary embodiments disclosed herein relate to improved contactor assemblies for welding wire feeders. The embodiments find particular application as (or in) portable electric arc engine welders, often used when the location of the welding operation is not expected to remain constant, such as, for example, welding operations at job sites which change regularly or welding operations covering large areas at a single job site. It is to be appreciated, however, that the exemplary embodiments discussed herein are also amenable to other like applications.

2. Discussion of the Art

Electric arc engine welders are generally well known. Typically, in electric arc welders, a power source passes current between an electrode and a work piece. Often, the electrode is a continuous welding wire drawn from a supply of welding wire, such as a drum or reel, which is passed through a contact tip or gun on its way to being melted and deposited onto the work piece. The gun can be provided with a selectively operable switch for applying welding power from the power source to the electrode (i.e., the wire) for establishing an arc between an exposed portion of the electrode and the work piece. Wire feeders are often used to advance the welding wire, preferably in a consistent and controllable manner, to the welding gun for use in the welding operation. Welding wire feeders can be manufactured in several forms, each optimized for a specific application. Common classifications of wire feeders include robotic wire feeders, portable wire feeders, tractor wire feeders and bench mount wire feeders.

Portable wire feeders are often used when the location of the welding operation or operations is likely to change or does not always remain constant (e.g., shipyards). This might include, for example, welding operations at job sites that change day-to-day or welding operations that cover a large area at a single job site. Examples of portable wire feeders are generally taught in the following U.S. patents: Bellefleur U.S. Pat. No. 4,665,300; Rybicki U.S. Pat. No. 6,213,375; Kroll U.S. Pat. No. 4,508,954; Chandler U.S. Pat. No. 6,225,596; Miller U.S. Pat. No. 5,410,126; Grimm U.S. Pat. No. 5,836,539; and Luo U.S. Pat. No. 6,705,563, all expressly incorporated herein by reference.

Preferably, portable wire feeders are able to supply their respective welding operations with welding wire in a manner much like that of a conventional stationary wire feeder. This is often more difficult in the portable wire feeder because it is likely to be subjected to repeated movement and used in connection with a wide range of work environments, many of which can be severe. In contrast, conventional stationary wire feeders are often used in controlled and unchanging environments, such as a work shop or factory floor. In addition to functioning like a stationary wire feeder, the portable wire feeder is preferably compact and lightweight enabling it to be more easily moved and used in confined work areas. Other desirable characteristics of portable wire feeders are ruggedness and durability.

In one conventional welding arrangement, a portable wire feeder is connected to a remotely positioned power source through a power source cable, also known as an electrode cable. The wire feeder is additionally connected to a welding gun by a guide hose. A motorized feeding system in the wire feeder employs rollers to advance or pay welding electrode wire from a supply of wire (often a spool of wire) through the guide hose to the welding gun. For this purpose, the guide hose can include an internal tube for transporting the wire from the feeder to the gun, in addition to electrical wiring for providing power (such as control circuitry) to the gun. Optionally, the guide hose can further include passageways for transporting shielding gas to the gun and/or for circulating cooling fluid through or to the gun.

More particularly, portable wire feeders typically include a housing or enclosure with an input crimp or lug terminal for connecting the power source cable to a bus bar, and an output connected to the guide hose to which welding power from the power source is provided together with the welding wire driven by the motorized wire feeding mechanism. Portable wire feeders, including the motorized wire feeding system and control circuitry thereof, can be powered by the arc current from the power source. Portable feeders typically include a means for switching the arc current to the welding guide hose, such as a contactor. A trigger on the gun closes a switch to initiate the welding operation, which causes the contactor to provide welding current to the guide hose and also starts the motor for feeding wire to the guide hose. The welding arc current flows through and is switched on and off by the contactor of the portable wire feeder.

Over time, contacts of the contactor, also referred to herein as an electromechanical switch, deteriorate from the arcing and from heating. When this occurs, heretofore the whole contactor was replaced as a complete unit. This had been considered desirable in the past because of the reduced inventory of parts required to service a wire feeder and the simplification of the replacement process. However, there is a sizable segment of the wire feeder market that has the skills necessary to do a contactor repair on a part-by-part basis and/or is willing to stock replacement parts, including the several parts that comprise a contactor assembly. Often, these users are sensitive to the replacement costs of the contactor assembly and are continuously looking for cost savings.

Thus, for example, when the contacts of a contactor assembly are worn, and the remainder of the contactor assembly is in good condition, it may be desirable to replace only the contacts. Typically, the coil and frame of the contactor assembly have longer useful lives than the contacts and may not necessarily require replacement when the contacts initially fail. Thus, there is a need for improved portable wire feeders and contactor assemblies therefore to facilitate replacement of selected parts of the contactor assembly. This would enable a customer to replace only select components of the contactor assembly when it fails, rather than replacing the entire contractor assembly as a unitary component. Advantages to be gained include the lowering of replacement costs associated with failing contactor assemblies, as well as reducing environmental waste.

SUMMARY

In accordance with one embodiment, a portable wire feeder is provided for providing welding wire and welding current to a welding operation. More particularly, in accordance with this embodiment, the wire feeder includes an input electrically connected to a power source and an output selectively electrically connected to the input to receive welding current delivered to the input from the power source and to provide the welding current and welding wire to the welding operation through a guide hose. The wire feeder further includes a contactor for selectively electrically connecting the input to the output. The contactor includes a first electrical terminal electrically connected to the input, a second electrical terminal electrically connected to the output and a conductive bridge member movable between a first position in which the bridge member electrically connects the first electrical terminal to the second electrical terminal and a second position wherein the bridge member is separated from at least one of the first and second electrical terminals to electrically isolate the terminals from one another. At least one of the first electrical terminal, the second electrical terminal and the bridge member is independently removable from the contactor for servicing or replacement. A motorized wire feeding system includes a motor and a feed roll driven by the motor to direct the welding wire from a wire supply to the output for provision of the welding wire to the welding operation through the guide hose.

In accordance with another aspect, a welding wire feeder assembly is provided. More particularly, in accordance with this embodiment, the wire feeder assembly includes a wire feeder housing having an input electrically connected to a power source to receive welding current therefrom and an output to which a guide hose is connected and extends to a welding operation. A contactor assembly is disposed in the housing for selectively electrically connecting the input to the output for providing the welding current to the welding operation through the guide hose. The contactor includes a housing, a first stud removably secured to the housing and electrically connected to the input, and a second stud removably secured to the housing and electrically connected to the input. The contactor further includes a bridge member disposed within the housing and movable between a first position wherein the first and second studs are electrically connected through the bridge member and a second position wherein the first and second studs are electrically isolated from one another. An actuator is removably connected to the bridge member for moving the bridge member between the first and second positions. A motorized wire feeding system includes a motor and a feed roll driven by the motor to direct welding wire from a welding wire supply to the output and through the guide hose to the welding operation.

In accordance with yet another embodiment, a contactor for an arc welding wire feeder is provided. More particularly, in accordance with this embodiment, the wire feeder includes a housing to which first and second electrical terminal studs are removably connected. The first stud is electrically connected to an input power cable which delivers power from a remotely positioned power source. The second stud is electrically connected to an output of the wire feeder wherein power provided to the output is electrically connected to a consumable electrode wire of the wire feeder. A conductive bridge member is removably disposed in the housing and is movable between a first position in which the bridge member electrically couples the first stud to the second stud and a position in which the bridge member is separated from at least one of the first and second studs to electrically isolate the studs from one another. An actuator is removably connected to the bridge member to move the bridge member between the first position and the second position.

DETAILED DESCRIPTION

Figure 1:
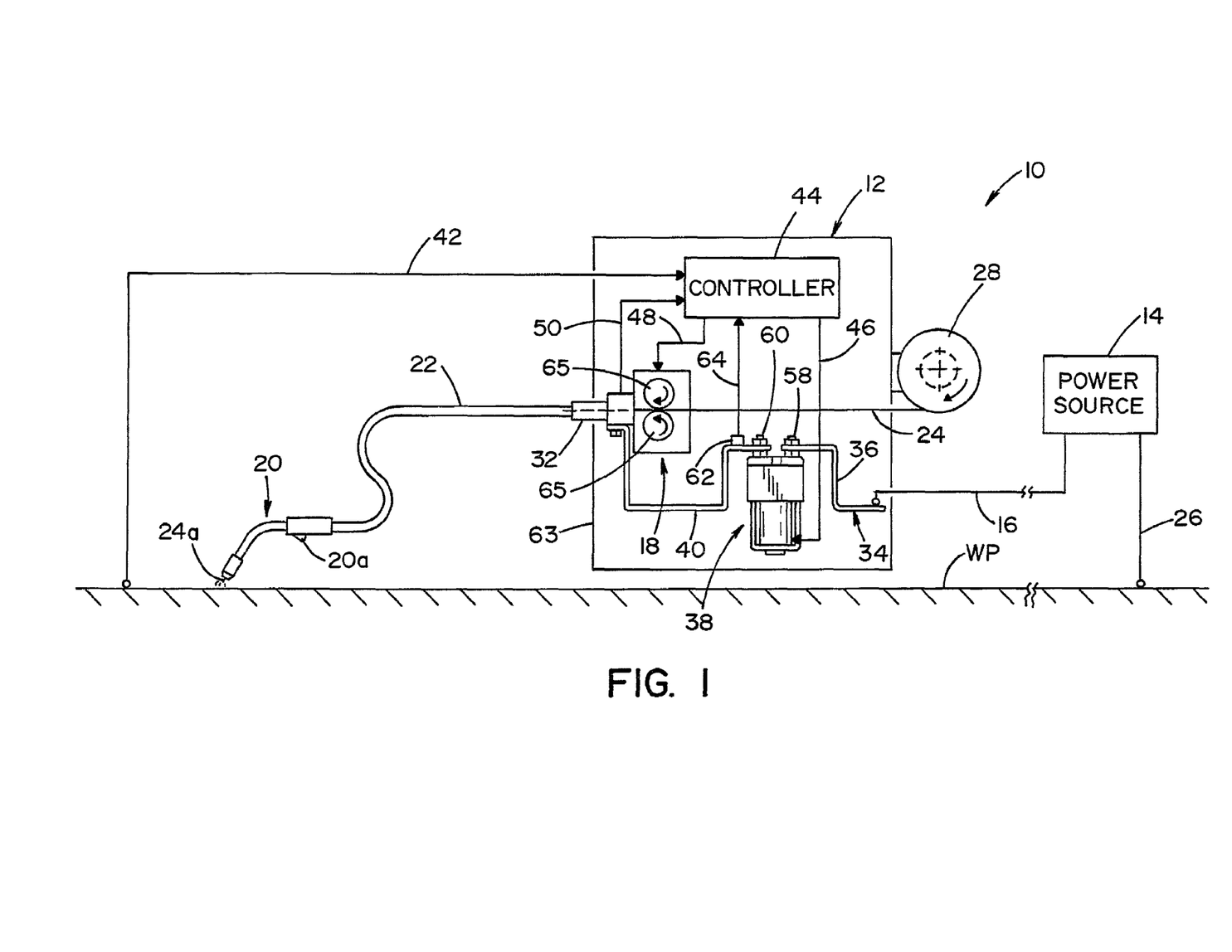
FIG. 1 is a schematic view of an electric arc welder having a wire feeder connected to a power source for performing a welding operation on a workpiece.

FIG. 1 schematically shows an electric arc welder or system for electric arc welding generally designated by reference numeral 10 according to one exemplary embodiment. The illustrated welder 10 includes a wire feeder 12 connected to a remotely positioned power source 14 by an input cable 16 (or electrode lead). Through the input cable 16, the power source 14 delivers welding current to the wire feeder 12. As shown, the wire feeder 12 can be a portable wire feeder solely powered by an arc voltage (or welding current) supplied by the power source 14. Thus, welding current is delivered to the wire feeder 12 by the input cable 16 and power for the feeder's motorized feeding system 18, and the feeder's control circuitry, is drawn from this welding current. Alternatively, the wire feeder can be configured as a tractor wire feeder or some other type of wire feeder. Also, although not included in the illustrated embodiment, a control cable can optionally extend between the power source 14 and the wire feeder 12, separately spaced from the electrode lead 16.

As is known and understood by those skilled in the art, the wire feeder control circuitry can be used to operate the motorized feeding system 18; sense and display measurements related to the welding current, such as display the arc voltage passing through to the gun 20; selectively connect the welding wire 24 to the welding current supplied by the power source 14, such as through contactor assembly 38; and/or enable the trigger 20a to be used for operating the contactor assembly 38. As is also known and understood by those skilled in the art, the wire feeder 12 is additionally connected to welding gun 20 by a guide hose 22. The motorized feeding system 18 of the wire feeder 12 is used to selectively advance or pay welding electrode wire 24 through the guide hose 22 to the welding gun 20. As illustrated, the power source 14, which can be an AC or DC power source and can be fitted with whatever controls may be needed, can be grounded (i.e., electrically connected) to work piece WP through a power source work lead or cable 26.

With the power source 14 grounded to a work piece WP, gun trigger 20a can be actuated to selectively connect the welding current delivered to the wire feeder 12 to the wire 24 passing through the guide hose 22 and create a welding arc between the gun 20 (and specifically an exposed portion of the electrode wire 24a extending from the gun 20) and the work piece WP. Trigger 20a can also be used to actuate the motorized feeding system 18 of the wire feeder 12 to deliver additional consumable welding wire 24 to the gun 20.

More particularly, the wire feeder 12 provides additional welding electrode wire 24 when needed from a supply reel or spool 28 to the guide hose 22 via the motorized welding wire feeding system 18 and an output 32 coupled to the hose 22. As known and understood by those skilled the art, the power source 14 converts input power to provide welding current and voltage wave forms via the input cable 16 (electrode lead) for selective application of the welding signal to a welding process through a circuit formed by the input cable 16, wire feeder input 34 with a first or input bus bar 36 and contactor type switching device 38, also referred to herein as a contactor assembly, and through second or output bus bar 40 providing electrical connection from the contactor assembly 38 to the guide hose 22 at wire feeder output 32. Thus, the input 34 is electrically connected to the power source 14 and the output 32 is selectively electrically connected to the input 34 to receive welding current delivered to the input 34 from the power source 14 and to provide the welding current to the welding operation (adjacent wire tip 24a) through the guide hose 22. Specifically, it is the contactor assembly 38 that selectively electrically connects the input 34 to the output 32.

The work lead 26, which grounds the power source 14 to the work piece WP, provides a power current return path. A workpiece sense cable or lead 42 is provided from the workpiece WP to a control board or controller 44 in the wire feeder 12, which communicates control signals with the contactor assembly 38, the motorized wire feeding system 18 and the output 32. The controller 44 is coupled to the contactor assembly 38, output 32, and wire feeding system 18, and operates to control the operating condition of the contactor assembly 38 and the wire feeding system 18 by providing a contactor control signal 46 and a wire feed control signal 48 according to a trigger signal 50 from trigger 20a of gun 20 via output 32.

In operation, controller 44 generates contactor control signal 46 upon receipt of trigger signal 50. More particularly, the controller 44 provides the contactor control signal 46 in a first state to electrically connect input stud 58 to output stud 60, both of the contactor assembly 38, when the gun trigger 20a is actuated, and in a second state to electrically isolate input stud 58 from output stud 60 when trigger 20a is not actuated. Optionally, a thermal sensor 62 can be provided on output bus bar 40, or adjacent the contactor assembly 38, for providing a temperature signal 64 to the controller 44. The temperature signal 64 can be used by the controller 44 in determining whether to provide contactor control signal 46 and/or to provide actuator control signal in the first or second state.

In operation during a welding procedure, an operator actuates trigger 20a on the gun 20 causing activation of on/off signal 46 from controller 44 to selectively provide electrical connection between electrical terminals 58, 60 in a first or a closed operating condition or position and to electrically separate or isolate electrical terminals 58, 60 from one another in a second or open position. Thus, the operating condition of the contractor assembly 38 determines whether electrical power is provided to output 32 and hence controls application of welding current to the welding workpiece WP through the gun 20 and guide hose 22. The motorized feeding system 18 also receives electrical power from the output side of the contactor assembly 38 (e.g., from the second bus bar 40), such that when the contactor assembly 38 is closed in a first position, the welder 10 provides welding wire 24 from supply reel 28 to the guide hose 22 via output 32 at a controlled rate.

Reel 28 may be internal to or outside of (as illustrated) a wire feeding housing enclosure 63, wherein welding wire 26 is drawn or paid out from supply reel 28 via feeding system 30. The feeding system 18 includes a motor (not shown) driving one or more feed reels 65 so as to direct wire 24 from reel 28 to output 32 for provision of wire 24 to a welding operation through guide hose 22. The unillustrated motor of the feeding system 30 can be separately supplied or can be powered by power from the power source 14 via contactor assembly 38 and output bus bar 40 as shown. The wire feeder 12 may also include apparatus (not shown) for directing shielding gas to the welding operation via the guide hose 22.

Figure 2:
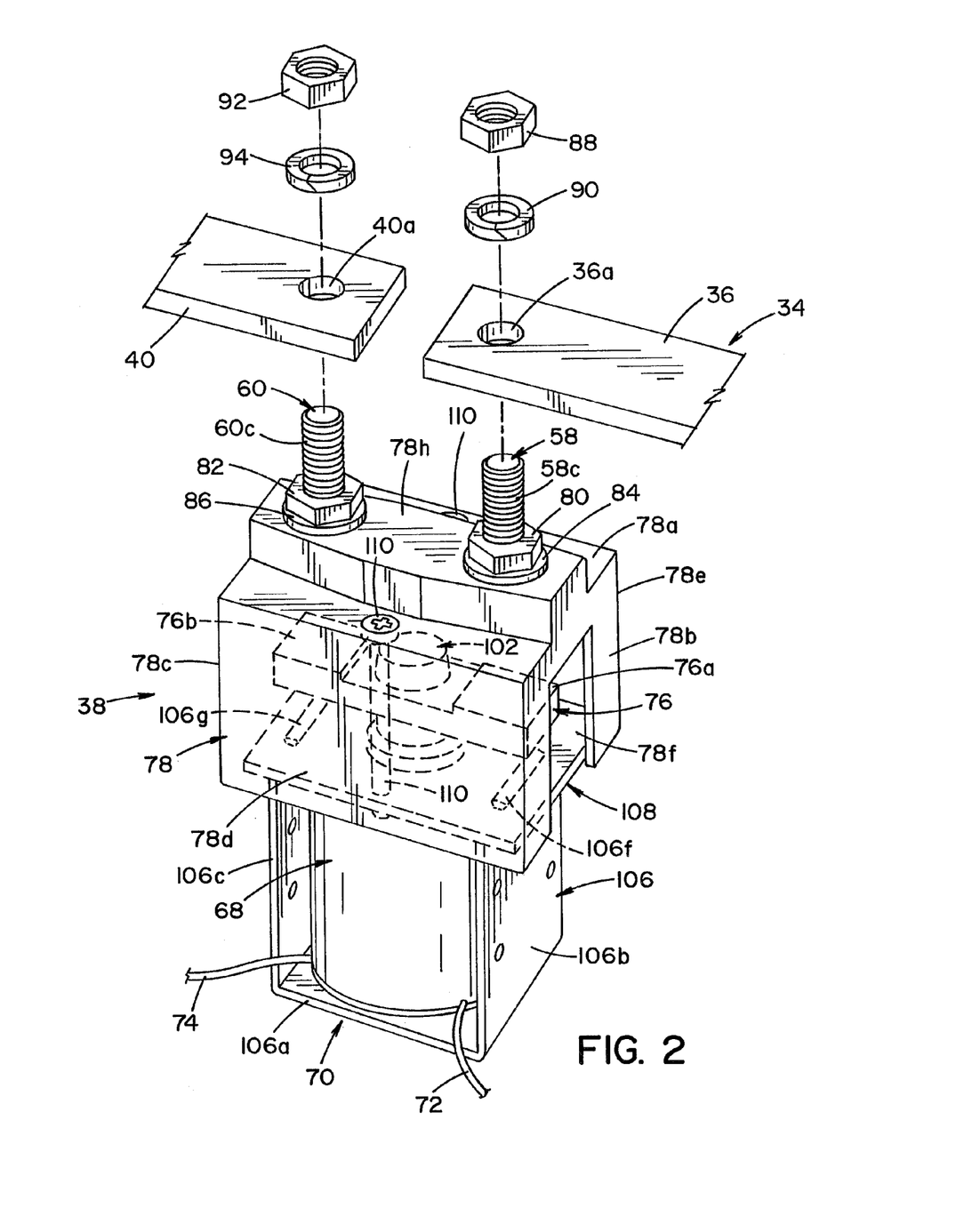
FIG. 2 is a perspective view, partially exploded, illustrating an exemplary wire feeder contactor assembly in the wire feeding apparatus of FIG. 1.

With additional reference to FIG. 2, the contactor assembly 38 includes an actuator, such as solenoid actuator 70 having coil leads 72, 74, that selectively moves a conductive bridge member 76 for selective connection or isolation of terminal studs 58, 60 according to contactor control signal 46 that selectively energizes or de-energizes coil 68 of contactor solenoid actuator 70. The conductive bridge member 76 can be, as illustrated, housed or enclosed within contactor housing 78, which can be formed of a relatively nonconductive material to isolate studs 58, 60 from one another. As will be described in more detail below, the solenoid actuator 70 includes magnetic sleeve coil 68 to which leads 72, 74 are connected, core shaft member 100 received within coil 68, and solenoid housing 106.

Figure 3:
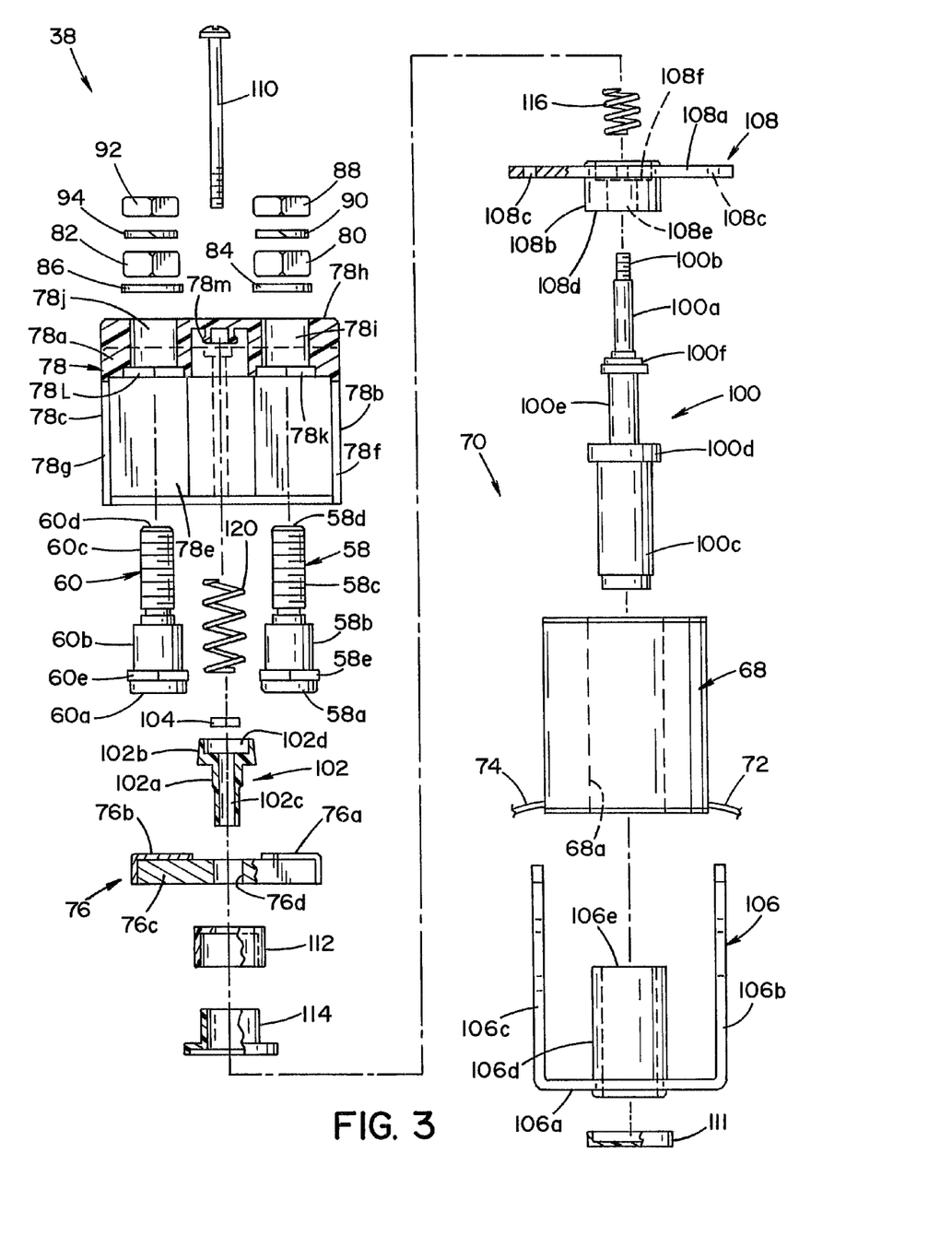
FIG. 3 is an exploded view of the contactor assembly of FIG. 2, including an input stud, an output stud and a conductive bridge member.
Figure 4:
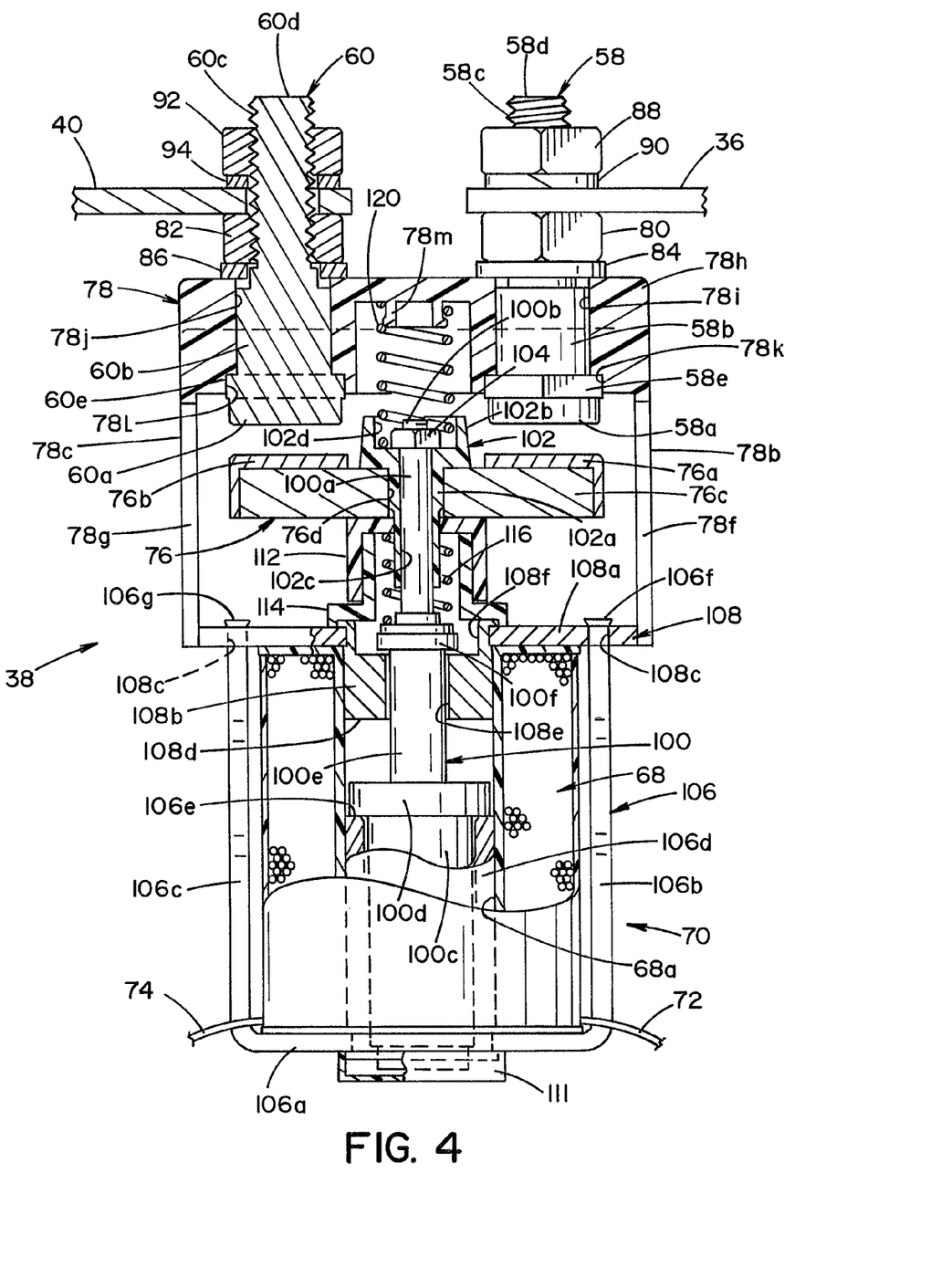
FIG. 4 is a partial cross-sectional view of the contactor assembly of FIG. 2 showing the bridge member in a position to electrically isolate the studs from one another.
Figure 5:
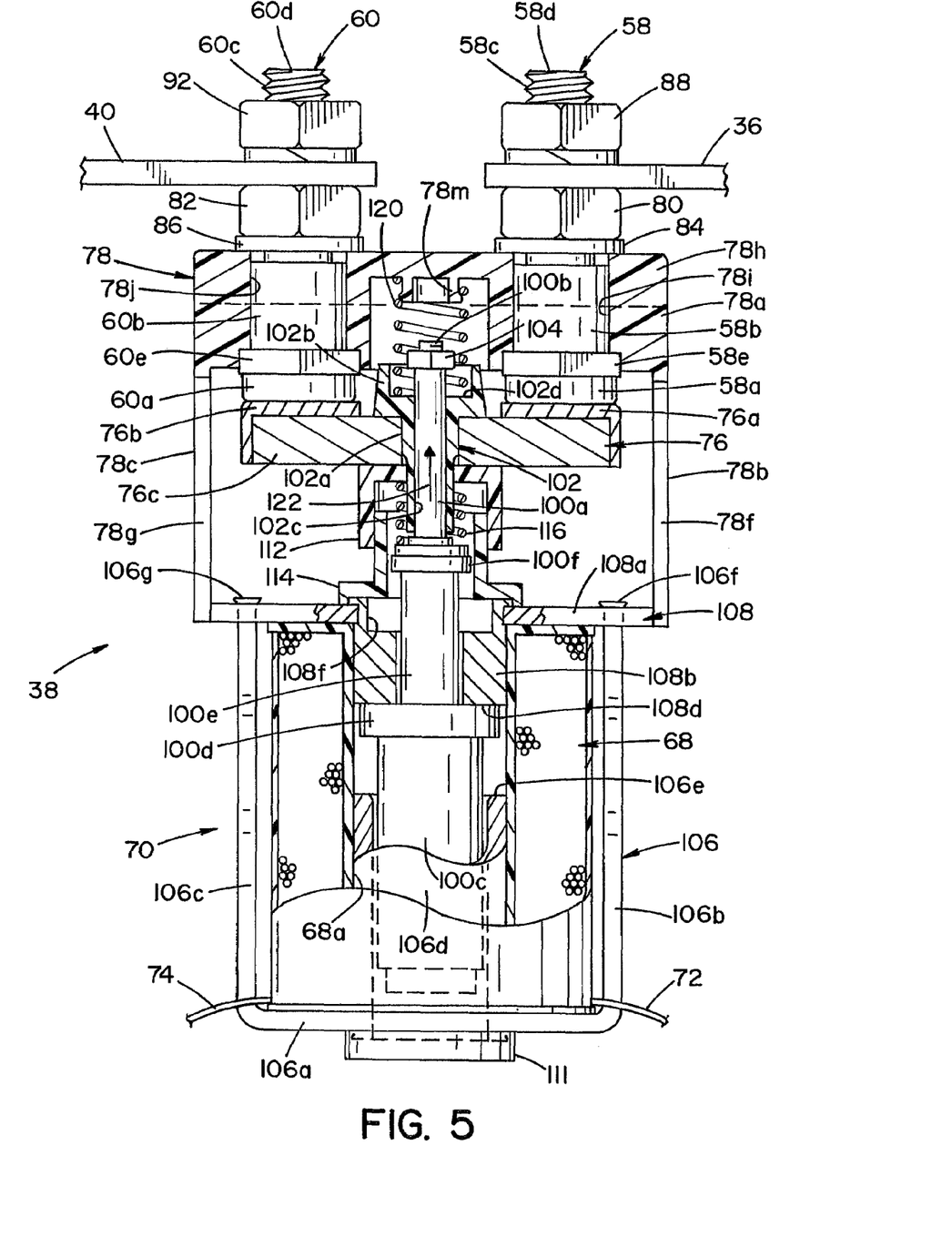
FIG. 5 is another partial cross-sectional view of the contactor assembly of FIG. 2 showing the bridge member in a position electrically connecting the studs to one another.

With additional reference to FIGS. 3-5, the studs 58, 60 of the contactor assembly 38 each include a respective head portion 58a, 60a, a cylindrical base portion 58b, 60b and a threaded portion 58c, 60c extending from respective base portions 58b, 60b to respective ends 58d, 60d. The head portions 58a, 60a can include respective noncylindrical or hexagonal portions 58e, 60e for limiting rotation of respective studs 58, 60 relative to contactor housing 78. As illustrated, the contactor housing 78 can be formed of a plurality of walls, including rectangular main wall 78a, and side walls 78b, 78c, 78d, 78e depending from respective edges of main wall 78a. End side walls 78b, 78c define apertures or cut-outs 78f, 78g. A raised section 78h can extend from a surface of main wall 78a opposite that which faces bridge member 76 and has walls 78b-78e dependent therefrom. The wall 78a and raised section 78h together define stud apertures 78i, 78j that receive respective studs 58, 60 therein. Corresponding noncylindrical or hexagonal countersink portions 78k, 78l of apertures 78i, 78j mate with respective hexagonal portions 58e, 60e to limit rotation of the studs 58, 60 relative to the housing 78.

The studs 58, 60 are received in respective apertures 78i, 78j and are removably connected or secured to the housing 78 by threaded fasteners or nuts 80, 82 which threadedly engage threaded portions 58c, 60c of the studs. Washers 84, 86 can be interposed between the nuts 80, 82 and the raised portion 78h of the housing 78. The input terminal stud 58 is further coupled to the input bus bar 36 by the threaded portion 58c being received through first bus bar aperture 36a and having threaded fastener or nut 88 threadedly received thereon. A washer 90 can be disposed between the nut 88 and the bus bar 36. Similarly, the second contactor terminal stud 60 is coupled to the second or output bus bar 40 by threaded portion 60c being received through second bus bar aperture 40a and having nut 92 and washer 94 received thereon. Since the electrode lead 16 electrically connects the power source 14 to the first bus bar 36, switched power is provided to the wire feeding system 18 and output 32 when the contactor assembly 38 is in the closed condition (shown in FIG. 5).

As will be described in more detail below, the conductive bridge member 76 of the contactor assembly 38 is removably connected to the solenoid's core shaft member 100 which is movable by the solenoid's coil 68. More particularly, the bridge member 76 is movable by the core shaft member 100 according to the contactor control signal 46 applied by the controller 44 (FIG. 1) to solenoid control leads 72, 74 between a first position (FIG. 5) in which bridge member 76 electrically couples the studs 56 and 60 to one another and a second position (FIG. 4) in which bridge member 76 is separated from the studs 56, 60 to thereby electrically isolate the contactor terminals and inhibit current flow to the welding gun 20 and wire feeding system 18.

The bridge member 76 can be formed of any suitable conductive material, and may include a conductive contacts 76a, 76b, as illustrated, facing or adjacent the stud heads 56a, 60a. In the illustrated embodiment, bridge body 76c defines an aperture 76d for mounting the bridge means to the shaft member 100. More particularly, in the illustrated embodiment, sleeve mounting member 102 has a shaft portion 102a received through bridge aperture 76d and a head portion 102b which rests against the bridge body 76d. The shaft portion 102c has a diameter substantially matching a diameter of the bridge aperture 76d. Sleeve mounting member 102 further includes an axial throughhole 102c. The sleeve mounting member 102 can be formed of a generally nonconductive material and referred to as an insulator for electrically isolating the bridge member 76.

Distal portion 100a of core shaft member 100 is received through the throughhole 102c and thereby through bridge aperture 76d. Threaded end 100b receives a threaded fastener or nut 104 thereon to fixedly secure the shaft member 100 to the bridge member 76. In particular, nut 104 can be received within counter sink 102d of sleeve mounting member 102. The shaft member 100 is generally formed of a material such that it can be moved by the coil 68 when electricity is supplied thereto by leads 72, 74. As is known to those skilled in the art, the direction of current supplied by leads 72, 74 determines the direction of movement of the shaft member 100 within the coil 68.

The actuator 70 includes a housing 106 having base wall 106a and side walls 106b, 106c extending from opposed edges of base wall 106a. As illustrated, the housing 106 can include integral sleeve member 106d fixedly attached to base wall 106a and extending therefrom between side walls 106b, 106c. The housing 106 can be connected to the contactor housing 78. More particularly, common wall assembly 108, including common wall member 108a and sleeve 108b, can be fixedly secured to the solenoid housing 106 and to a contactor housing 78. In the illustrated embodiment, the side walls 106b, 106c can be partially received in elongated slots 108c defined in common wall member 108a and rivet connected thereto (i.e., headless end of walls 106b, 106c hammered so as to form an elongated head that prevents removal of common wall member 108 from solenoid housing 106) resulting in rivet ends 106f, 106g. With reference to FIG. 2, contactor housing 78 can be connected to common wall member 108a by any removable fastening means, such as by one or more conventional elongated fasteners or bolts 110 threadedly engaged with wall member 108a.

When assembled, core shaft member 100 has its base 100c received in sleeve member 106d such that shaft member base flange 100d can rest against end 106e of sleeve member 106d (when contactor is in its first position of FIG. 5). Cap 111 can be snap-fit onto the sleeve member 106d extending from base wall 106a in a direction opposite side walls 106b, 106c. Coil 68 is received annularly about the sleeve member 106d (i.e., sleeve member 106d is received in coil aperture 68a). When disposed in sleeve member 106d, axial movement of shaft member 100 (such as caused by current being provided to coil 68 via leads 72, 74) is limited in one direction by flange 100d engaging sleeve end 106e and in the opposite direction by flange 100d engaging end 108d of sleeve member 108b.

More particularly, shaft portion 100e is received through sleeve aperture 108e. Telescoping sleeve members 112, 114 which can be formed of a relatively non-conductive material, are disposed between bridge member 76 and wall member 108a, and further disposed about the shaft member 100.

Washer member 100f can be disposed on shaft 100a to provide a seat to spring 116. As shown, washer member 100f can be received in countersink 108f of sleeve member 108b. Spring 116 can be disposed around shaft member 100 and between bridge member 76 and shaft flange 100f, and further disposed within the sleeve members 112, 114 such that spring 116 urges the sleeve members 112, 114 axially apart from one another.

One or more springs, optionally including spring 116, can be provided for urging the conductor bridge member 76 toward the second (open) position (position shown in FIG. 4). In the illustrated embodiment, main spring 120 is installed between bridge member 76 and main housing wall 78a for urging the bridge member 76 toward the second position. Main wall 78a includes spring retention structure 78m for positioning the spring 120 and connecting the spring 120 to the housing 78. An opposite end of the spring 120 is received over nut 104 in a countersink 102d. Insulator sleeve 102 electrically isolates bridge member 76 from the spring 120.

In operation, spring 120 urges or biases conductive bridge member 76 toward the second or open position of FIG. 4, such that upon loss of control signal 46, the contactor assembly 38 goes to a fail-safe open position. As shown in FIG. 5, application of control signal 46 of a first state to the two solenoid leads 72, 74 causes the solenoid shaft member 100 to move the bridge member 76 in a first direction 122 toward the first position for electrically connecting the studs 56, 60. Applying a second signal state 46 moves the bridge member 76 in a second opposite direction to the second position of FIG. 4 to effectively separate the bridge member 76 from the studs 56, 60 and thereby electrically isolate the studs from one another. The first state signal 46 can simply be the provision of power to the leads 72, 74 in a first direction, appropriate for moving the core shaft member 100 in the direction 122 and the second state signal 46 can be the provision of power to the leads 72, 74 in a second opposite direction.

Unlike prior art contactor assemblies, the illustrated contactor assembly 38 is constructed such that its components can be individually removed, serviced and/or replaced. More particularly, most components of the contactor assembly 38 are removably attached or connected to other components of the contactor assembly. Accordingly, when one component fails or is otherwise ready for servicing or replacement, that component can be removed, serviced and/or replaced, and then reinstalled in the contactor assembly. In the illustrated embodiment, each of the studs and the bridge member 76 is independently removable from the contactor assembly 38 for servicing and/or replacement. For example, each of the contacts or studs 58, 60 can be serviced or replaced once worn, particularly when the remainder of the contactor assembly 38 is in good condition.

To remove the studs 58, 60, the contactor assembly 38 is disconnected from the bus bars 38, 40 by removing nuts 88, 92 and their corresponding washers 90, 94. Next, the contactor housing 78 can be disconnected from the solenoid housing 106. In the illustrated embodiment, fasteners 110 are removed so that housing 78 can be detached from common wall assembly 108. With the housing 78 removed, the studs 58, 60 (one or both) can be removed from the housing 78 by unthreading respective nuts 80, 82 and pulling the studs from the housing.

Other components of the contactor assembly 38 can also be individually removed, serviced and/or replaced, and subsequently reinstalled. For example, the spring 120, which is removably secured within the housing 78, could be replaced when the contactor housing 78 is detached from the solenoid housing 106. Though the spring 120 is held to the housing wall 78a by retention structure 78m, the spring 120 (or the structure 78m) can be resilient enough to permit detachment of the spring from the housing 78. The bridge member 76 can be removed by unthreading nut 104 from core shaft member 100. Likewise, insulator 102 and sleeves 112, 114 could be replaced.

Figure 6:
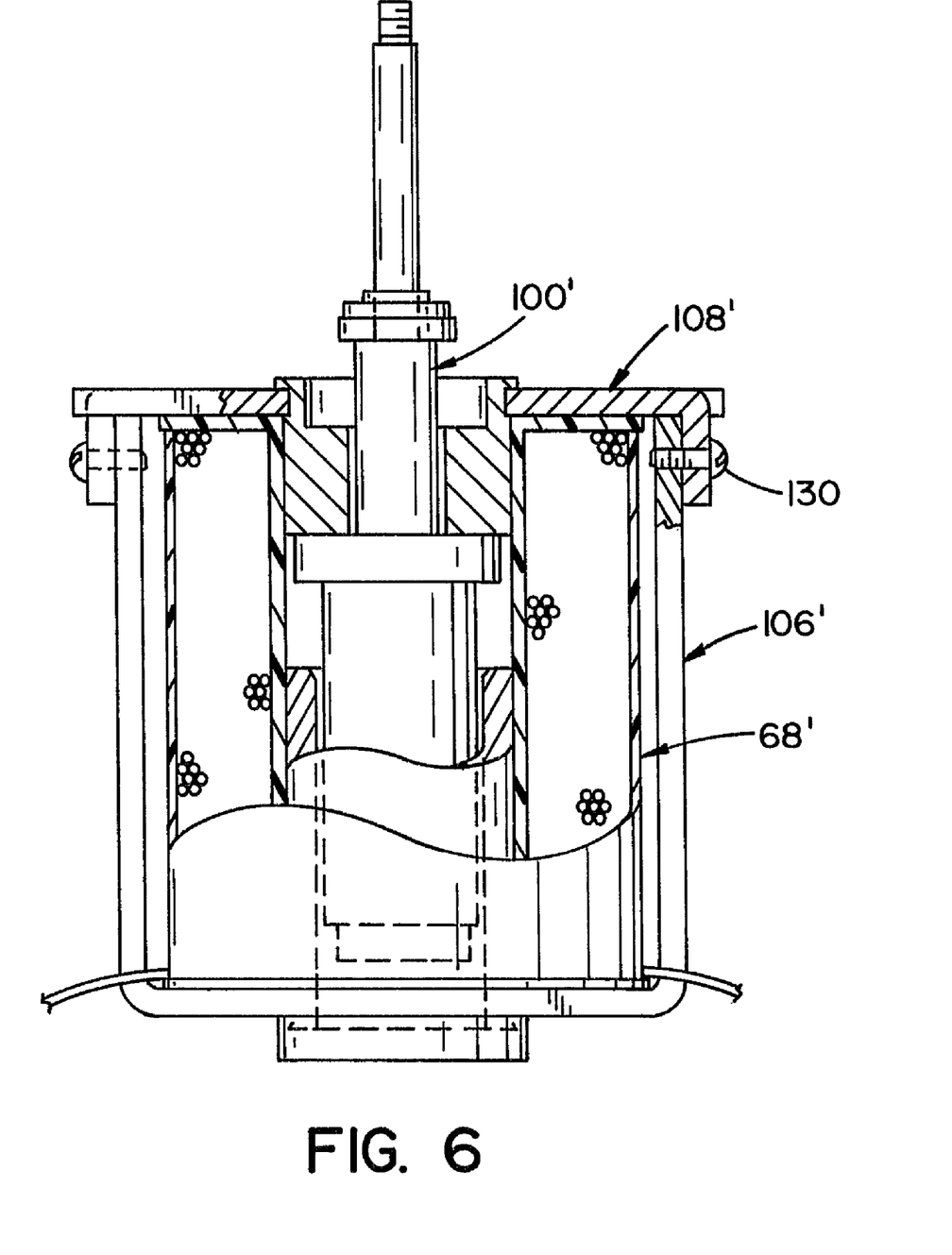
FIG. 6 is a partial cross-sectional view of an alternate actuator for use in a contactor assembly.

The actuator 70 is also independently removable from the contactor assembly 38 and therefore could be removed and replaced separately from the components housed in contactor housing 78. In the illustrated embodiment, the coil 68, housing 106, core shaft 100 and common wall assembly 108 can be replaced as an integral unit. However, in alternate constructions, coil 68, housing 106, core shaft 100 and common wall structure 108 can be individually replaceable. For example, in one alternate construction shown in FIG. 6, the rivet connection between housing 106 and common wall assembly 108 is replaced by a more removable type connection. In the illustrated alternate embodiment, common wall assembly 108' is removably secured to actuator housing 106' via fasteners 130. The fasteners 130 can be removed so that common wall assembly 108', including wall 108a and sleeve 108b, can be removed (i.e., disconnected) from the housing 106'. This enables individual removal access to coil 68' and core shaft 100', as well as to the wall assembly 108' and the housing 106'. Individual removal access enables these components to be individually removed, serviced and/or replaced. To facilitate replacement of specific component parts of the contactor assembly 38, one or more components (such as contactor studs 58, 60; spring 120, bridge member 76, insulator 102, etc.) can be packaged individually or together in any combination as a kit.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A portable wire feeder for providing welding wire and welding current to a welding operation, said wire feeder comprising:
   an input electrically connectable to a power source;
   an output selectively electrically connectable to said input to receive welding current delivered to said input from said power source and to provide said welding current and welding wire to the welding operation through a guide hose;
   a contactor for selectively electrically connecting said input to said output, said contactor including a contactor housing, a first electrical terminal removably connected to said contactor housing and electrically connected to said input, a second electrical terminal removably connected to said contactor housing and electrically connected to said output, and a conductive bridge member movable between a first position in which said bridge member electrically connects said first electrical terminal to said second electrical terminal and a second position wherein said bridge member is separated from at least one of said first and second electrical terminals to electrically isolate said terminals from one another, at least one of said first electrical terminal and said second electrical terminal including a noncylindrical portion for limiting rotation relative to said contactor housing; and
   a motorized wire feeding system including a motor and a feed roll driven by said motor to direct said welding wire from a wire supply to said output for provision of said welding wire to the welding operation through said guide hose.

2. The portable wire feeder of claim 1 where said contactor housing includes at least one aperture having a noncylindrical countersink portion for mating with the one of said first and second terminals that includes said noncylindrical portion.

3. The portable wire feeder of claim 1 where said contactor housing includes at least one aperture having a noncylindrical countersink portion that corresponds with the one of said first and second terminals that includes said noncylindrical portion for limiting the rotation of the one of said first and second terminals relative to said housing.

4. The portable wire feeder of claim 1 where said noncylindrical portion is polygonal.

5. The portable wire feeder of claim 4 where said noncylindrical portion is hexagonal.

6. The portable wire feeder of claim 1 where said noncylindrical portion is oval.

7. The portable wire feeder of claim 2 where said noncylindrical countersink portion is polygonal.

8. The portable wire feeder of claim 1 where said noncylindrical countersink portion is oval.

9. A welding wire feeder assembly, comprising:
   a wire feeder housing having an input electrically connectable to a power source to receive welding current therefrom and an output to which a guide hose is connectable to extend to a welding operation;
   a contactor assembly disposed within said housing for selectively electrically connecting said input to said output for providing said welding current to said welding operation through said guide hose, said contactor including:
      a housing,
      a first stud secured to said housing and electrically connected to said input,
      a second stud secured to said housing and electrically connected to said output,
      a bridge member disposed within said housing and movable between a first position wherein said first and second studs are electrically connected through said bridge member and a second position wherein said first and second studs are electrically isolated from one another, said bridge member defining an aperture,
      an actuator connected to said bridge member for moving said bridge member between said first and second positions, said actuator including a shaft member having a distal portion extending through said aperture, and
      a removable fastener thereon said distal portion to secure said bridge member to said shaft member; and
   a motorized wire feeding system including a motor and a feed roll driven by said motor to direct welding wire from a welding wire supply to said output and through said guide hose to said welding operation.

10. The welding wire feeder assembly of claim 9 where said actuator is a solenoid.

11. The welding wire feeder assembly of claim 9 where the contactor assembly further includes a sleeve mounting member disposed between said shaft and said bridge member.

12. The welding wire feeder assembly of claim 11 where said sleeve mounting member includes a head portion which rests against the bridge member.

13. The welding wire feeder assembly of claim 11 where said sleeve mounting member includes a shaft portion received through said aperture.

14. The welding wire feeder assembly of claim 13 where said shaft portion has an exterior diameter substantially matching an interior diameter of said aperture.

15. The welding wire feeder assembly of claim 11 where said sleeve mounting member is formed of a generally non-conductive material.

16. The welding wire feeder assembly of claim 15 where the mounting sleeve member electrically isolates the bridge member from the shaft member.

17. The welding wire feeder assembly of claim 11 where said mounting member includes a countersink for receiving said removable fastener.

18. A contactor for a welding wire feeder, comprising:
a contactor housing to which first and second electric terminal studs are connected, said first stud electrically connectable to an input power cable which delivers power from a remotely positioned power source and said second stud electrically connectable to an output of a wire feeder wherein power provided to the output is electrically connected to a consumable electrode wire of the wire feeder;
a conductive bridge member disposed in said contactor housing and movable between a first position in which said bridge member electrically couples said first electrical stud to said second stud and a second position in which said bridge member is separated from at least one of said first and second electrical studs to electrically isolate said studs from one another;
an actuator housing removably connected to said contactor housing, and
an actuator at least partially disposed in said actuator housing, said actuator connected to said bridge member to move said bridge member between said first position and said second position.

19. The contactor of claim 18 further comprising a common wall member fixedly secured to said contactor housing and said solenoid housing.

20. The contactor of claim 19 where said common wall member includes at least one slot having a portion of said solenoid housing passing therethrough and forming a rivet end.

21. The contactor of claim 19 where said contactor housing is connected to said common wall member by a removable fastener.

22. The contactor of claim 21 where said removable fastener is a bolt.

23. The contactor of claim 18 where said actuator housing includes an integral sleeve member fixedly attached to a base wall of said actuator housing.

24. The contactor of claim 23 where a base of said actuator is received in said integral sleeve.

25. The contactor of claim 18 where said contactor housing is connected to said actuator housing by at least one removable fastener.

* * * * *